United States Patent
Yao et al.

(10) Patent No.: US 7,099,115 B2
(45) Date of Patent: Aug. 29, 2006

(54) HEAD GIMBAL ASSEMBLY WITH PRECISE POSITIONING ACTUATOR FOR HEAD ELEMENT, DISK DRIVE APPARATUS WITH THE HEAD GIMBAL ASSEMBLY, AND MANUFACTURING METHOD OF THE HEAD GIMBAL ASSEMBLY

(75) Inventors: Ming Gao Yao, Kwai Chung (HK); Masashi Shiraishi, Kwai Chung (HK); Tamon Kasajima, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 826 days.

(21) Appl. No.: 10/235,586

(22) Filed: Sep. 6, 2002

(65) Prior Publication Data
US 2003/0147177 A1  Aug. 7, 2003

(30) Foreign Application Priority Data
Feb. 2, 2002  (CN) .................. PCT/CN02/00054

(51) Int. Cl.
*G11B 5/596* (2006.01)
*G11B 21/24* (2006.01)

(52) U.S. Cl. ................... 360/244.7; 360/294.4

(58) Field of Classification Search ........ 360/294.4, 360/291.9, 244.7
See application file for complete search history.

(56) References Cited

U.S. PATENT DOCUMENTS

| | | | | |
|---|---|---|---|---|
| 4,647,999 A | * | 3/1987 | Mlinaric et al. ........ | 360/291.9 |
| 5,734,523 A | * | 3/1998 | Scheidecker et al. .... | 360/234.5 |
| 5,745,319 A | * | 4/1998 | Takekado et al. ........ | 360/78.05 |
| 5,898,541 A | * | 4/1999 | Boutaghou et al. ...... | 360/294.4 |
| 6,108,175 A | * | 8/2000 | Hawwa et al. .......... | 360/294.4 |
| 6,118,637 A |   | 9/2000 | Wright et al. ........... | 360/294.4 |
| 6,246,552 B1 | * | 6/2001 | Soeno et al. ............ | 360/294.4 |
| 6,320,730 B1 | * | 11/2001 | Stefansky et al. ....... | 360/294.4 |
| 6,351,354 B1 | * | 2/2002 | Bonin .................... | 360/294.6 |
| 6,414,823 B1 | * | 7/2002 | Crane et al. ............ | 360/294.5 |
| 6,611,399 B1 | * | 8/2003 | Mei et al. ............... | 360/234.7 |
| 6,690,551 B1 | * | 2/2004 | Shiraishi et al. ........ | 360/294.4 |
| 6,700,749 B1 | * | 3/2004 | Shiraishi et al. ........ | 360/294.4 |
| 6,891,701 B1 | * | 5/2005 | Shiraishi et al. ........ | 360/294.4 |

FOREIGN PATENT DOCUMENTS

| | | |
|---|---|---|
| JP | 08 180 623 | 7/1996 |
| JP | 9-35230 | 2/1997 |

* cited by examiner

*Primary Examiner*—Andrea Wellington
*Assistant Examiner*—Christopher R. Magee
(74) *Attorney, Agent, or Firm*—Armstrong, Kratz, Quintos, Hanson & Brooks, LLP

(57) ABSTRACT

An HGA includes a head slider with at least one head element, a precise positioning actuator fixed to the head slider for precisely positioning the at least one head element, and a support for supporting the actuator. The actuator has a pair of movable arms capable of displacing in response to a drive signal applied to the actuator. The head slider is mounted between the pair of movable arms. The head slider and the actuator are adhered by at least one adhesive film.

57 Claims, 6 Drawing Sheets

HEAD GIMBAL ASSEMBLY WITH PRECISE POSITIONING ACTUATOR FOR HEAD ELEMENT, DISK DRIVE APPARATUS WITH THE HEAD GIMBAL ASSEMBLY, AND MANUFACTURING METHOD OF THE HEAD GIMBAL ASSEMBLY

FIELD OF THE INVENTION

The present invention relates to a head gimbal assembly (HGA) with a precise positioning actuator for a head element such as a thin-film magnetic head element or an optical head element, to a disk drive apparatus with the HGA and to a manufacturing method of the HGA.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Recently, recording and reproducing density along the radial direction or along the track width direction in the magnetic disk (track density) rapidly increase to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

To solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As an example of such additional actuator, there is a piggy-back structure actuator. This piggy-back structure actuator is formed by piezoelectric material of PZT in an I-character shape with one end section to be fixed to a suspension, the other end section to be fixed to a magnetic head slider and a pillar shaped movable arm connected between these end sections. On the suspension, stepwise stacked are the actuator and the magnetic head slider, namely, the actuator is caught between the suspension and the slider to form a stacked cantilever structure.

However, an HGA with such piggy-back structure actuator will have following various problems:

(1) Because of the stepwise stacked structure, a total thickness of the HGA around the magnetic head slider increases by the thickness of the actuator;
(2) The actuator as a whole consists of piezoelectric material such as PZT of a brittle material, and the actuator and the magnetic head slider are stacked to form a cantilever structure. An impact easily occurs with the moment and also shock resistance is very poor;
(3) Depending upon the size of the magnetic head slider, a travel of the magnetic head element during the precise positioning operation varies. Thus, it is difficult to obtain enough stroke;
(4) Because of three-dimensional and complicated attachment structure of the actuator, the handling at the time of an assembly of the HGA is very difficult and it is impossible to use a conventional HGA assembly equipment causing productivity to be very worse; and
(5) In order not to interfere with the movement of the actuator, it is necessary to assemble with keeping a gap between the actuator and the magnetic head slider and also between the actuator and the suspension. However, forming of such gap will more decrease the shock resistance and it is difficult to precisely keep the gap constant. Particularly, since it is difficult to keep the suspension, the actuator and the magnetic head slider in parallel precisely, the head characteristics deteriorates.

In order to solve the aforementioned problems, inventors of this application have been proposed an actuator with a structure in which a head slider is caught in a space between a pair of movable arms capable of displacing in response to a drive signal applied thereto.

According to the actuator with such structure, the thickness of the HGA around the magnetic head slider does not increase even if the actuator is attached. Also, since the actuator and the magnetic head slider are not stacked to form a cantilever structure, a shock resistance can be improved. Furthermore, since the magnetic head slider is caught in between the movable arms, it is possible to provide a constant travel to the slider even if the size of the magnetic head slider changes.

However, in case of actually assembling an HGA using such structured actuator, difficulty exists in fixing of top end sections of the movable arms of the actuator to side surfaces of the magnetic head slider. Particularly, when they are adhered to each other by coating a liquid type adhesive, not only required is a long time for the adhering process but also it is extremely difficult to uniformly control an adhering region and a thickness of the adhesive. The latter causes occurrence of variations in a stroke and a resonance characteristics of the actuator.

SUMMARY OF THE INVENTION

It is therefore an object of the present invention to provide an HGA with a precise positioning actuator for a head element, a disk drive apparatus with the HGA and a manufacturing method of the HGA, whereby an assembling time can be shortened.

Another object of the present invention is to provide an HGA with a precise positioning actuator for a head element, a disk drive apparatus with the HGA and a manufacturing method of the HGA, whereby a stable stroke and a stable resonance characteristics of the actuator can be obtained.

Further object of the present invention is to provide an HGA with a precise positioning actuator for a head element, a disk drive apparatus with the HGA and a manufacturing method of the HGA, whereby a countermeasure against ESD (electrostatic discharge) destruction can be easily achieved.

According to the present invention, an HGA includes a head slider with at least one head element, a pair of movable arms capable of displacing in response to a drive signal applied to the actuator. The head slider is mounted between the pair of movable arms. The head slider and the actuator are adhered by at least one adhesive film.

According to the present invention, furthermore, a disk drive apparatus includes at least one aforementioned HGA.

Since the HGA uses the adhesive film for adhering the head slider to actuator, the adhesion process can be performed very easily and thus a required time for the adhesion process can be greatly shortened. Also, by using the adhesive film, it is possible to precisely control an adhering region and to uniformly control a thickness of the adhering region.

Furthermore, since the actuator holds the head slider so that the slider is located in a space between the pair of movable arms, the thickness of the HGA around the head slider does not increase even if the actuator is attached. Thus, no modifications in size of the disk drive apparatus due to the mounting of the actuator is necessary. Also, since the head slider is mounted between the movable arms, the top end sections of the movable arms which actually transfer the displacement to the slider can be always positioned at the top end of the slider. Thus, it is possible to provide a constant travel to the slider even if the size of the head slider changes, and therefore an enough stroke of the head at the precise positioning operation can be always obtained.

It is preferred that top end sections of the pair of movable arms and side surfaces of the head slider are adhered by adhesive films, respectively. By thus using the adhesive film, it is possible to precisely control an adhering region and to uniformly control a thickness of the adhering region. As a result, a quite stable stroke and an extremely stable resonance characteristics of the actuator can be expected.

It is preferred that each of the pair of movable arms includes an elastic arm member and a piezoelectric element formed on a side surface of the arm member.

It is also preferred that the actuator further includes a base fixed to the support and that the arm members extend from the base.

It is preferred that the arm members and the base are made of an elastic sintered ceramic.

It is also preferred that the arm member has substantially the same cross sectional shape from a root thereof to a top end thereof, or that the arm member has at a top end section thereof a slider fixing section projected toward the head slider.

It is preferred that the actuator has a rough U-plane shape.

It is preferred that the at least one adhesive film is an anisotropic conductive film (ACF).

It is also preferred that the actuator further includes connection conductors formed on surfaces of the pair of movable arms, for grounding the ACF. Thus, a countermeasure against ESD destruction of the head element can be very easily achieved.

It is preferred that the arm members and the base are made of an elastic metal plate member. It is more preferred that the metal plate member is made of a stainless steel plate.

It is preferred that the arm member has at a top end section thereof a slider fixing section projected toward the head slider.

It is preferred that the actuator further includes a coupling member made of a metal plate member for coupling the pair of movable arms with each other at top end sections of the pair of movable arms, and that an opposite surface of an air bearing surface (ABS) of the head slider and the coupling member being adhered by the at least one adhesive film. Since the head slider is fixed to such coupling member, enough fixing strength of the head slider with the actuator can be expected and it is possible to greatly improve vertical impact resistance of the HGA. Also, easy mounting of the head slider can expected even if the size of the slider changes.

It is further preferred that each of the pair of movable arms includes an arm member made of an elastic metal plate member, and a piezoelectric element formed on a side surface of the arm member. In this case, preferably, the actuator further includes a base made of a metal plate member parallel to the coupling member and fixed to the support, and the pair of movable arms extend from the base. It is more preferred that the metal plate member is made of a stainless steel plate.

It is preferred that the at least one adhesive film is an ACF. Since the slider is grounded only by using the ACF for the adhesion between the slider and the actuator, the countermeasure against ESD destruction of the magnetic head element can be achieved very easily.

It is preferred that the at least one head element is at least one thin-film magnetic head element.

According to the present invention, a method of manufacturing a head gimbal assembly with a precise positioning actuator includes a step of preparing a head slider with at least one head element, the actuator with a pair of movable arms capable of displacing in response to a drive signal applied to the actuator, for catching the head slider in a space between the pair of movable arms and a support for supporting the actuator, a step of adhering top end sections of the pair of movable arms and side surfaces of the head slider being by adhesive films, respectively, and a step of fixing the actuator to the support.

Since the adhesive film is used for adhering the side surfaces of the head slider to the top end sections of the movable arms of the actuator, the adhesion process can be performed very easily and thus a required time for the adhesion process can be greatly shortened. Also, by using the adhesive film, it is possible to precisely control an adhering region and to uniformly control a thickness of the adhering region. As a result, a quite stable stroke and an extremely stable resonance characteristics of the actuator can be expected.

Also, since the actuator holds the head slider so that the slider is caught in a space between the pair of movable arms, the thickness of the HGA around the head slider does not increase even if the actuator is attached. Thus, no modifications in size of the disk drive apparatus due to the mounting of the actuator is necessary. Furthermore, since the head slider is caught in between the movable arms, the top end sections of the movable arms which actually transfer the displacement to the slider can be always positioned at the top end of the slider. Thus, it is possible to provide a constant travel to the slider even if the size of the head slider changes, and therefore an enough stroke of the head at the precise positioning operation can be always obtained.

It is preferred that the preparing step includes preparing, as the actuator, an actuator with the pair of movable arms, each having an elastic arm member and a piezoelectric element formed on a side surface of the arm member.

It is also preferred that the preparing step includes preparing, as the actuator, an actuator with a base fixed to the support, the arm members extending from the base.

It is further preferred that the preparing step includes preparing, as the actuator, an actuator with the arm members and the base made of an elastic sintered ceramic.

It is preferred that the preparing step includes preparing, as the actuator, an actuator with a pair of arm members each having substantially the same cross sectional shape from a root thereof to a top end thereof, or that the preparing step includes preparing, as the actuator, an actuator with a arm member having at a top end section thereof a slider fixing section projected toward the head slider.

It is also preferred that the preparing step includes preparing, as the actuator, an actuator with a rough U-plane shape.

It is preferred that the adhering step includes adhering the top end sections of the pair of movable arms and the side surfaces of the head slider by ACFs, respectively.

In this case, it is preferred that the preparing step includes preparing, as the actuator, an actuator with connection conductors formed on surfaces of the pair of movable arms thereof, for grounding the ACFs, respectively. Thus, a countermeasure against ESD destruction of the head element can be very easily achieved.

It is preferred that the preparing step includes preparing, as the actuator, an actuator with the arm members and the base made of an elastic metal plate members. In this case, preferably, the metal plate member is made of a stainless steel plate.

It is preferred that the preparing step includes preparing, as the actuator, an actuator with a arm member having at a top end section thereof a slider fixing section projected toward the head slider.

It is also preferred that the preparing step includes preparing, as the at least one head element, at least one thin-film magnetic head element.

According to the present invention, furthermore, a method of manufacturing a head gimbal assembly with a precise positioning actuator includes a step of preparing a head slider with at least one head element, the actuator with a pair of movable arms capable of displacing in response to a drive signal applied to the actuator and a coupling member made of a metal plate member for coupling the pair of movable arms with each other at top end sections of the pair of movable arms, and a support for supporting the actuator, a step of adhering an opposite surface of an ABS of the head slider and the coupling member by an adhesive film, and a step of fixing the actuator to the support.

Since the adhesive film is used for adhering the opposite surface of ABS of the head slider to the coupling member of the actuator, the adhesion process can be performed very easily and thus a required time for the adhesion process can be greatly shortened. Also, by using the adhesive film, it is possible to precisely control an adhering region and to uniformly control a thickness of the adhering region. Furthermore, since the head slider is fixed to such coupling member, enough fixing strength of the head slider with the actuator can be expected and it is possible to greatly improve vertical impact resistance of the HGA. Also, easy mounting of the head slider can expected even if the size of the slider changes.

Furthermore, since the actuator holds the head slider so that the slider is located in a space between the pair of movable arms, the thickness of the HGA around the head slider does not increase even if the actuator is attached. Thus, no modifications in size of the disk drive apparatus due to the mounting of the actuator is necessary. Also, since the head slider is mounted between the movable arms, the top end sections of the movable arms which actually transfer the displacement to the slider can be always positioned at the top end of the slider. Thus, it is possible to provide a constant travel to the slider even if the size of the head slider changes, and therefore an enough stroke of the head at the precise positioning operation can be always obtained.

It is preferred that the preparing step includes preparing, as the actuator, an actuator with the pair of movable arms, each having an arm member made of an elastic metal plate member, and a piezoelectric element formed on a side surface of the arm member.

It is also preferred that the preparing step includes preparing, as the actuator, an actuator with a base made of a metal plate member parallel to the coupling member and fixed to the support, the pair of movable arms extending from the base. In this case, it is more preferred that the metal plate member is made of a stainless steel plate.

It is preferred that the adhering step includes adhering the opposite surface of the ABS of the head slider and the coupling member by an ACF. Since the slider is grounded only by using the ACF for the adhesion between the slider and the actuator, the countermeasure against ESD destruction of the magnetic head element can be achieved very easily.

It is further preferred that the preparing step includes preparing, as the at least one head element, at least one thin-film magnetic head element.

Further objects and advantages of the present invention will be apparent from the following description of the preferred embodiments of the invention as illustrated in the accompanying drawings.

DESCRIPTION OF THE PREFERRED EMBODIMENTS

Figure 1:
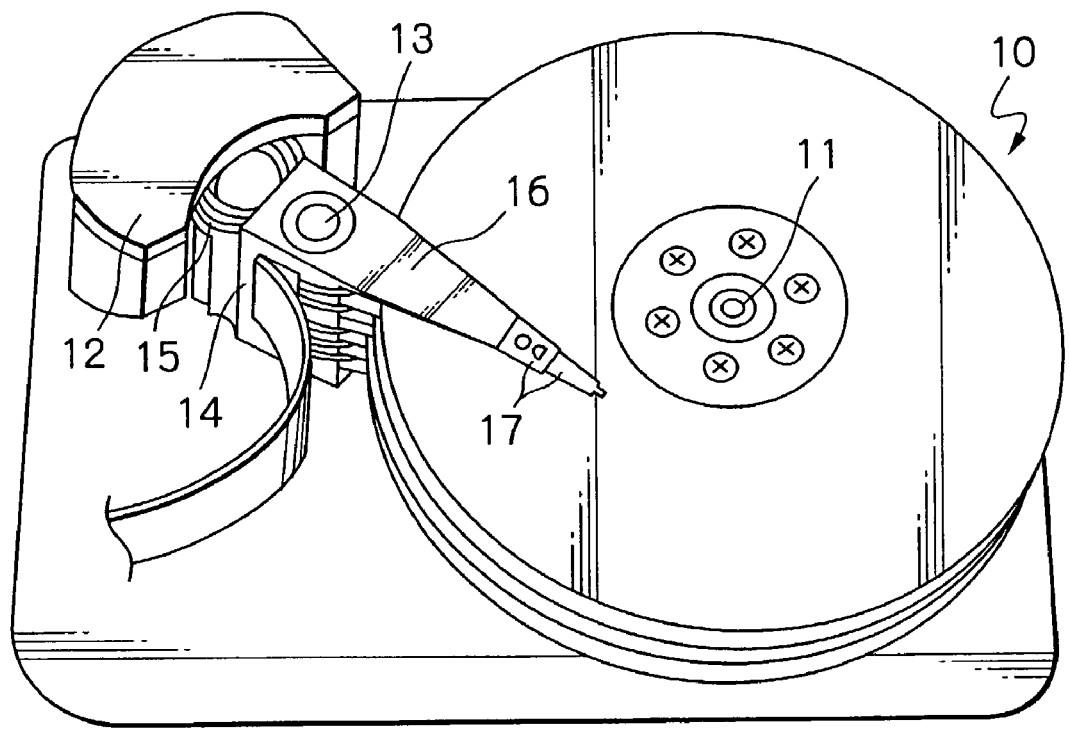
FIG. 1 is an oblique view schematically illustrating main components of a magnetic disk drive apparatus in a preferred embodiment according to the present invention.
Figure 2:
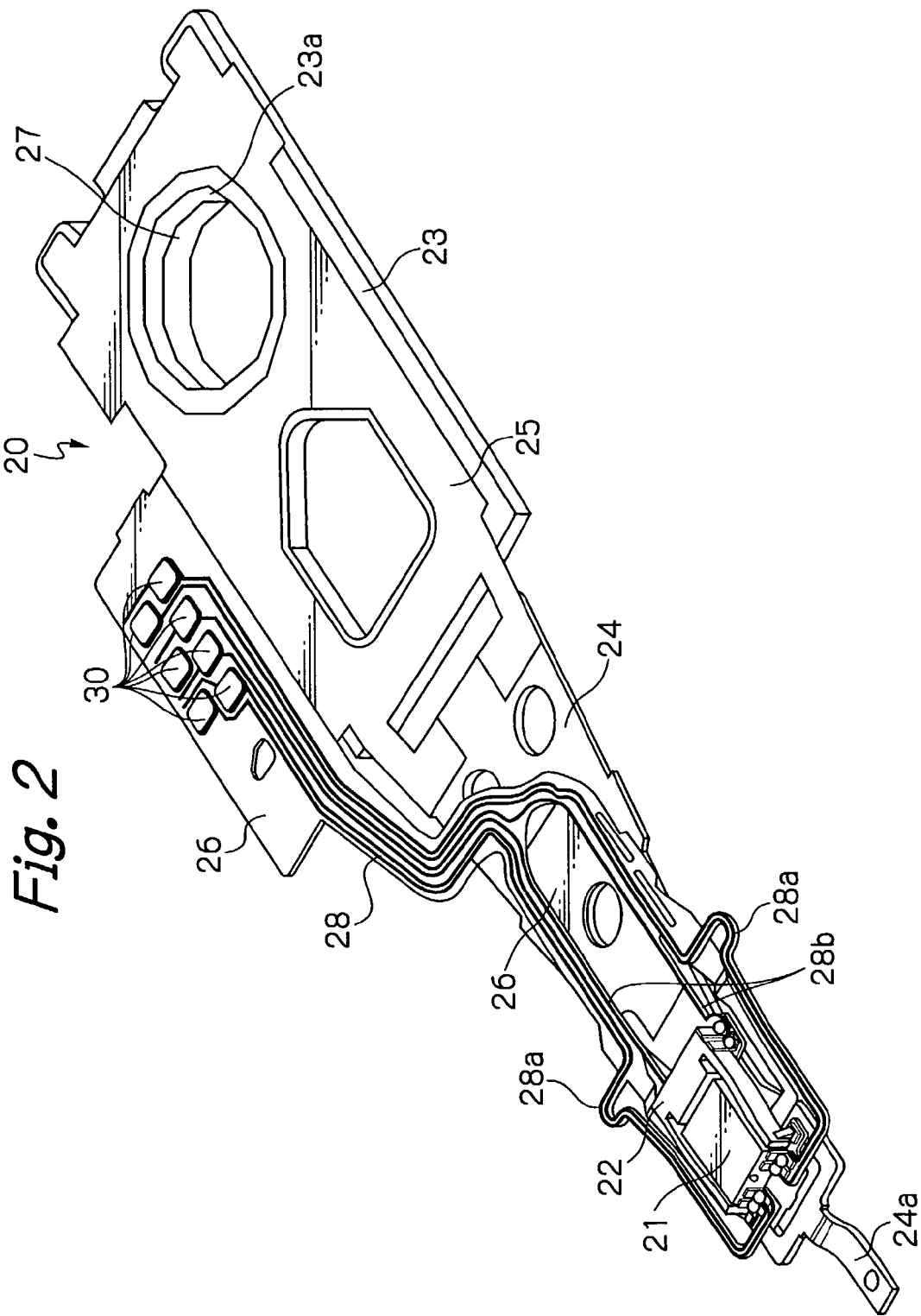
FIG. 2 is an oblique view illustrating the whole structure of an HGA in the embodiment of FIG. 1.
Figure 3:
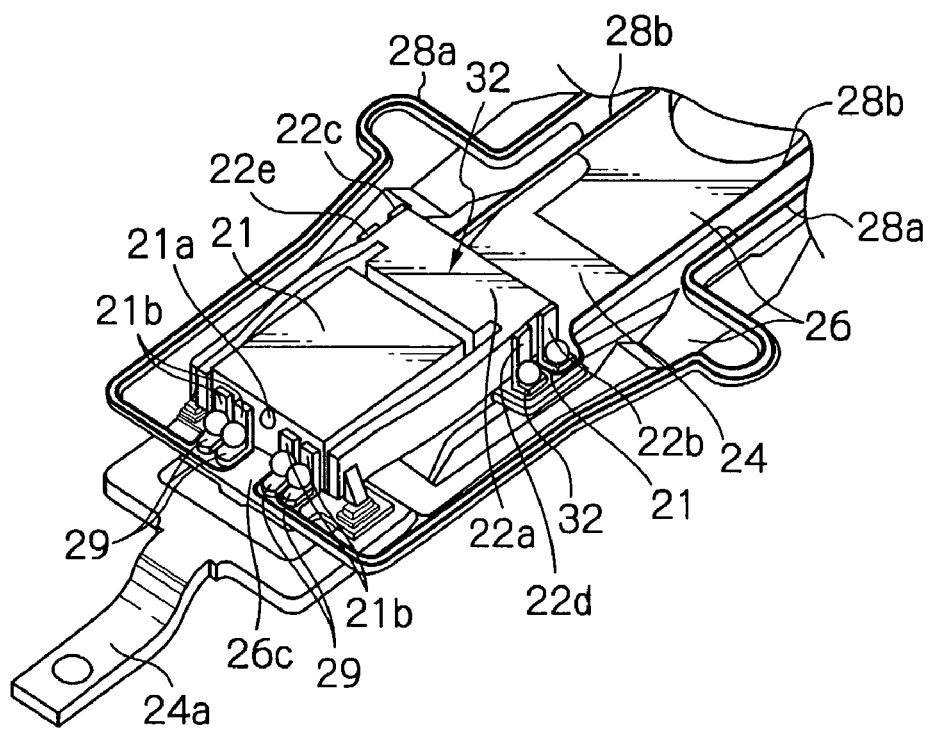
FIG. 3 is an oblique view illustrating a top end section of the HGA in the embodiment of FIG. 1.
Figure 4:
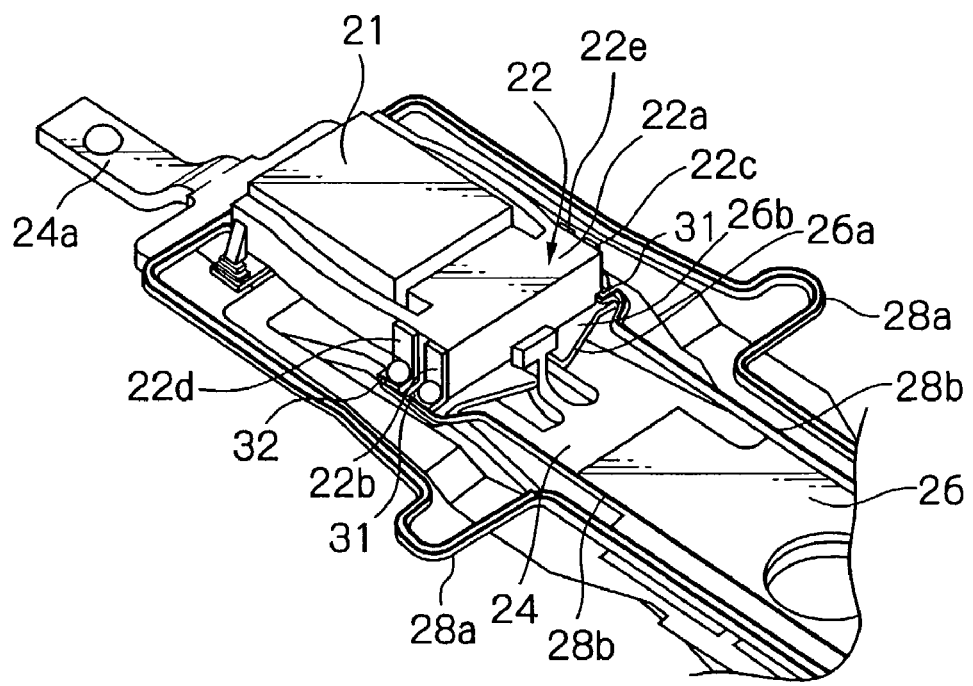
FIG. 4 is an oblique view illustrating the top end section of the HGA in the embodiment of FIG. 1, seen from different direction from that of FIG. 3.

FIG. 1 illustrates main components of a magnetic disk unit of a preferred embodiment according to the present invention, FIG. 2 illustrates the whole structure of an HGA in this embodiment, and FIGS. 3 and 4 illustrate a top end section of the HGA in this embodiment, seen from different directions with each other.

In FIG. 1, reference numeral 10 denotes a plurality of magnetic hard disks rotating around an axis 11, and 12 denotes an assembly carriage device for positioning each magnetic head element on a track of each disk. The assembly carriage device 12 is mainly constituted by a carriage 14 capable of rotating around an axis 13 and a main actuator 15 such as for example a VCM for driving the carriage 14 to rotate.

Base sections at one ends of a plurality of drive arms 16 stacked along the axis 13 are attached to the carriage 14, and one or two HGAs 17 are mounted on a top section at the other end of each arm 16. Each of the HGAs 17 has a slider mounted at its top end section so that the slider opposes to one surface (recording and reproducing surface) of each of the magnetic disks 10.

As shown in FIGS. 2 to 4, the HGA is assembled by fixing a fine tracking actuator 22 for precise positioning of a thin-film magnetic head element 21a to a top end section of a suspension 20. The actuator 22 holds side surfaces of a magnetic head slider 21 with the thin-film magnetic head element so that the slider 21 is caught in a space between its movable arms.

A main or course actuator of VCM 15 shown in FIG. 1 is used for rotationally moving the drive arm 16 to which such HGA 17 is attached, so as to move the whole assembly. The actuator 22 contributes the fine positioning of the HGA, which cannot be adjusted by the main or course actuator 15.

The suspension 20 is substantially formed, as shown in FIGS. 2 to 4, by first and second load beams 23 and 24, a resilient hinge 25 coupled with both these first and second load beams 23 and 24, a resilient flexure 26 fixed on the second load beam 24 and the hinge 25, and a circular base plate 27 formed at an attaching section 23a of the first load beam 23.

The flexure 26 has a flexible tongue 26a depressed by a dimple (not shown) formed on the second load beam 24 at its one end section. On the tongue 26a, fixed is a base section 22a of the actuator 22 via an insulation layer 26b made of for example polyimide.

The flexure 26 has elasticity for supporting flexibly the magnetic head slider 21 through the actuator 22 by this tongue 26a. The flexure 26 is made of in this embodiment a stainless steel plate (for example SUS304TA) with a thickness of about 20μm. The flexure 26 is fixed with the second load beam 24 and with the hinge 25 at a plurality of points by pinpoint welding.

The hinge 25 has elasticity providing, to the second load beam 24, a force for pressing the magnetic head slider 21 toward the direction of a magnetic disk surface through the actuator 22 in operation. The hinge 25 is made of in this embodiment a stainless steel plate with a thickness of about 40 μm.

The first load beam 23 is made of in this embodiment a stainless steel plate with a thickness of about 100 μm, and supports the whole surface of the hinge 25. The fixing of the first load beam 23 with the hinge 25 is performed by pinpoint welding at a plurality of points. The second load beam 24 is also made of in this embodiment a stainless steel plate with a thickness of about 100 μm, and fixed to the hinge 25 at its rear end section. The fixing of the second load beam 24 with the hinge 25 is performed also by pinpoint welding at a plurality of points. At a top end of this second load beam 24, formed is a lift-tab 24a for separating the HGA from the magnetic-disk surface during out of operation is prepared.

The base plate 27 to be attached to the drive arm 16 shown in FIG. 1 is made of in this embodiment a stainless steel or iron plate with a thickness of about 150 μm. This base plate 27 is fixed to the attaching section 23a of the first load beam 23 by welding.

On the flexure 26, a flexible conductor member 28 including a plurality of trace conductors of a thin-film multi-layered pattern is formed or disposed. The conductor member 28 is formed by a known method similar to the patterning method of forming a printed circuit board on a thin metal plate such as a flexible printed circuit (FPC). For example, the member 28 is formed by sequentially depositing a first insulation material layer made of a resin such as polyimide with a thickness of about 5 μm, a patterned Cu layer (trace conductor layer) with a thickness of about 4 μm, and a second insulation material layer made of a resin such as polyimide with a thickness of about 5 μm on the flexure 26 in this order. Within the regions of the connection pads formed for connecting with the actuator, the magnetic head element and an external circuit, an Au layer is deposited on the Cu layer and there is no second insulation material layer on the Au layer.

In this embodiment, the conductor member 28 consists of a first conductor member 28a with two trace conductors connected to the magnetic head element 21a for one side, thus four trace conductors for both sides, and a second conductor member 28b with a trace conductor connected to the actuator 22 for one side, thus two trace conductors for both sides.

One end of the trace conductors of the first conductor member 28a is electrically connected to head element connection pads 29 formed on an individually separated and freely movable section 26c of the flexure 26. The connection pads 29 are ball-bonded to terminal electrodes 21b of the magnetic head slider 21 by Au bonding, wire bonding or stitch bonding. The other end of the trace conductors of the first conductor member 28a is electrically connected to external circuit connection pads 30 used for connection with an external circuit.

One end of trace conductors of the second conductor member 28b is electrically connected to actuator connection pads 31 formed on an insulation layer 26b on the tongue 26a of the flexure 26. The connection pads 31 are connected to A channel and B channel signal terminals 22b and 22c formed on a base 22a of the actuator 22, respectively. The other end of trace conductors of the second conductor member 28b is electrically connected to the external circuit connection pads 30.

On the flexure 26, ground connection pads 32 grounded are formed. These pads 32 are electrically connected to ground connection conductors 60 (FIG. 6) formed on the surfaces of the actuator 22.

A structure of the HGA according to the present invention is not limited to the aforementioned structure. Furthermore, although it is not shown, a head drive IC chip may be mounted on a middle of the suspension 20.

Figure 5:
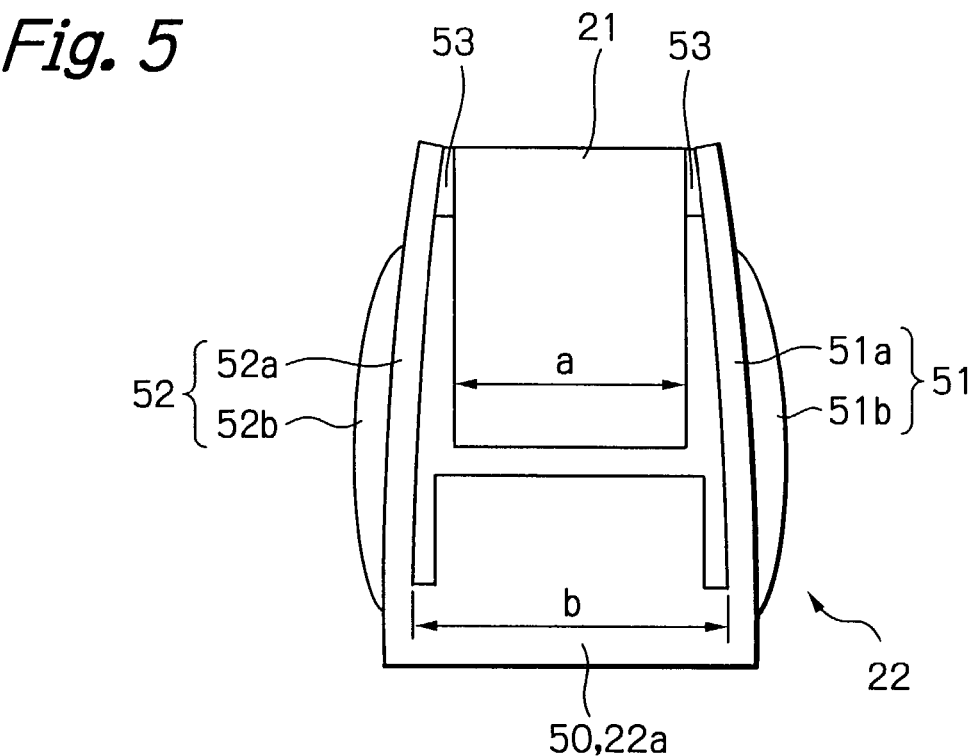
FIG. 5 is a plane view illustrating a structure of an actuator and an adhering structure of this actuator to a magnetic head slider in the embodiment of FIG. 1.
Figure 6:
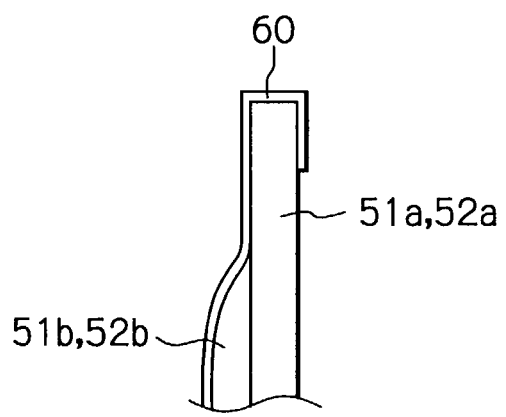
FIG. 6 is a plane view illustrating a top end section of the actuator in the embodiment of FIG. 1.
Figure 7:
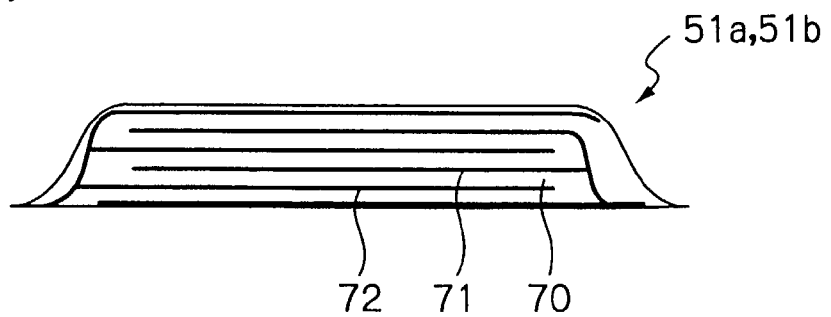
FIG. 7 is a sectional view illustrating a structure of a piezoelectric element section of the actuator shown in FIG. 6.

FIG. 5 illustrates a structure of the actuator 22 and an adhering structure of this actuator 22 to a magnetic head slider in the embodiment of FIG. 1, FIG. 6 illustrates a top end section of the actuator in this embodiment, and FIG. 7 illustrates a structure of a piezoelectric element section of the actuator 22.

As will be noted from FIG. 5, the actuator 22 has a rough U-plane shape and consists of a base 50 (22a) to be fixed to a suspension and a pair of movable arms 51 and 52 substantially perpendicularly extending from both side ends of the base 50. The movable arms 51 and 52 consist of arm members 51a and 52a and piezoelectric elements 51b and 52b formed on side surfaces of the arm members 51a and 52a, respectively.

The base 50 and the arm members 51a and 52a of the actuator 52 are united by an elastic sintered ceramic. Since the main sections of the actuator are made of the elastic sintered ceramic that is strong for bending, a shock resistance of the actuator itself increases.

In this embodiment, the shape of each of the arm members 51a and 51b is flat without a level difference from its root coupled with the base 50 to its top end so as to have substantially the same cross section.

The magnetic head slider 21 is caught between top end sections of these flat arm members 51a and 52a and adhered to the flat arm members 51a and 52a. This adhesion is performed by inserting an ACF 53 between each arm member and the slider 21, and by pressing them with heating. Usage of the ACF 53 for the adhesion presents very easy adhesion process and shortage of a required time for the adhesion process. Also, by using the ACF 53, it is possible to precisely control an adhering region and to uniformly control a thickness of the adhering region. As a result, a quite stable stroke and an extremely stable resonance characteristics of the actuator 22 can be expected.

In this embodiment, as shown in FIG. 6, the ground connection conductors 60 patterned to cover the adhering regions and electrically connected to the ground connection terminals 32 are formed on the surfaces of the arm members 51a and 52a. Therefore, if the ACF 53 is used for the adhesion between the slider 21 and the actuator 22, the slider 21 is grounded resulting the a countermeasure against ESD destruction of the magnetic head element 21a to achieve very easily.

The ground connection conductors 60 may be fabricated by printing a thick-film pattern made of Pt, Au or Pt+Au and then sintering it.

The spacing b between the arm members 51a and 52a is determined to a value larger than the width a of the magnetic head slider 21 (b>a). Since the arm members 51a and 52a are shaped in flat and b>a, when assembling with the magnetic head slider 21, it is necessary to deform the arm members 51a and 52a such that their interval will narrow toward their top end sections. Thus, only the top end sections of the arm members 51a and 52a are adhered to the side surfaces of the magnetic head slider 21 and there exists air gaps between the remaining sections of the arm members 51a and 52a and the side surfaces of the magnetic head slider 21. As a result, the movable arms 51 and 52 will not contact to the magnetic head slider 21 to limit the movement of the actuator 22 in operation.

A thickness of the actuator 22 is determined to a value equal to or thinner than that of the magnetic head slider 21 so that the total thickness of the HGA will not increase due to the mounting of the actuator. Conversely, by thickening the actuator 22 up to the thickness of the magnetic head slider to be held, strength of the actuator itself can be increased without increasing the total thickness of the HGA.

Each of the piezoelectric elements 51b and 52b has, as shown in FIG. 7, a multi-layered structure of alternately laminating piezoelectric material layers 70, signal electrode layers 71 and ground (common) electrode layers 72. By applying voltage across the signal electrode layers 71 and the ground (common) layers 72, the piezoelectric material layers 70 expand and contract. The piezoelectric material layer 70 is made of material that expands and contracts by reverse piezoelectric effect or by electrostrictive effect. The signal electrode layers 71 are electrically connected to the A channel signal terminal 22b or the B channel signal terminal 22c, and the ground (common) electrode layers 72 are electrically connected to the ground connection pad 32 via a ground (common) terminal 22d or 22e, shown in FIGS. 3 and 4.

In case that the layers 70 are made of piezoelectric material such as PZT (Lead Zirconate Titanate Oxidization), these piezoelectric material layers are in general polarized so as to improve their displacement performance. The polarized direction is the lamination direction of the piezoelectric material layers 70. When voltage is applied across the electrode layers and the direction of the produced electrical field is the same as the polarized direction, the piezoelectric material layer between the electrode layers expands in its lamination direction (piezoelectric longitudinal effect) and contracts in its in-plane direction (piezoelectric lateral effect). Contrary to this, when the direction of the produced electrical field is in inverse as the polarized direction, the piezoelectric material layer between the electrode layers contracts in its lamination direction (piezoelectric longitudinal effect) and expands in its in-plane direction (piezoelectric lateral effect).

If the voltage with a polarity which will induce the contraction or expansion is applied to the piezoelectric element 51b or 52b, the piezoelectric element contracts or expands in response to the applied voltage polarity and thus the movable arm 51 or 52 bends to trace a S-character resulting the top end section of the arm 51 or 52 to laterally and linearly displace. Thus, the magnetic head slider 21 fixed with the actuator 22 also laterally and linearly displaces. Since the slider displaces namely operates with linear motion not swinging or rotational motion, more precise positioning of the magnetic head element can be expected.

It is possible to apply voltages that induce mutually reverse motions may be simultaneously applied to the piezoelectric elements 51b and 52b, respectively. In other words, AC voltages may be simultaneously applied to the piezoelectric elements 51b and 52b so that one piezoelectric element expands when the other piezoelectric element contracts and vice versa. The position of the movable arms is centered when no voltage is applied to the piezoelectric elements. In this case, the stroke of the movable arms become twice of that when the same voltage is alternately applied to the piezoelectric elements 51b and 52b. However, one of the piezoelectric elements is expanded and therefore the direction of the driving voltage opposes to that of the polarization in the piezoelectric material layer. Thus, if the applied voltage is high or the voltage is continuously applied, attenuation in polarization of the piezoelectric material layer may occur. It is desired therefore that a constant DC bias voltage in the same direction as the polarization direction be additionally applied to the AC voltage to form the driving voltage so that the direction of the driving voltage never opposes to that of the polarization in the piezoelectric material layer. The position of the movable arms is centered when only the bias voltage is applied to the piezoelectric elements.

In this specification, the piezoelectric material is material that expands or contracts by their reverse piezoelectric effect or electrostrictive effect. Any piezoelectric material applicable for the piezoelectric elements of the actuator can be used. However, for high rigidity, it is desired to use a ceramics piezoelectric material such as PZT[Pb(Zr,Ti)O$_3$], PT(PbTiO$_3$), PLZT[(Pb,La)(Zr,Ti)O$_3$], or barium titanate (BaTiO$_3$).

As aforementioned, since the HGA in this embodiment uses the ACF 53 for adhering the magnetic head slider 21 to the arm members 51a and 52a of the actuator 22, the adhesion process can be performed very easily and a required time for the adhesion process can be greatly shortened. Also, by using the ACF 53, it is possible to precisely control an adhering region and to uniformly control a thickness of the adhering region. As a result, a quite stable stroke and an extremely stable resonance characteristics of the actuator 22 can be expected.

In modifications, the adhesion process may be performed with using other adhesive film instead of the ACF. However, in the modifications, the magnetic head slider should be electrically grounded by means of gold ball bonding, solder bonding or electrical connection using Ag paste if the adhesive film is non-conductive.

Furthermore, since the actuator 22 in this embodiment has the arm members 51a and 52a shaped in flat with no level difference, stress will not converge on specific portions of the arm members when an impactive force is applied to the HGA. Thus, shock resistance of the actuator and also of the HGA can be remarkably improved.

Also, since the actuator 22 in this embodiment holds the side surfaces of the magnetic head slider 21 so that the slider 21 is caught in a space between the movable arms 51 and 52, the thickness of the HGA around the magnetic head slider does not increase even if the actuator 22 is attached. Thus, no modifications in size of the magnetic disk drive apparatus due to the mounting of the actuator is necessary. In addition, since the actuator 22 and the magnetic head slider 21 are not stacked to form a cantilever structure, the shock resistance can be further improved. Furthermore, since the magnetic head slider 21 is caught in between the movable arms 51 and 52, the top end sections of the movable arms 51 and 52, which actually transfer the displacement to the slider 21, can be always positioned at the top end of the slider 21. Thus, it is possible to provide a constant travel to the slider even if the size of the magnetic head slider 21 changes, and therefore an enough stroke of the magnetic head at the precise positioning operation can be always obtained.

Figure 8:
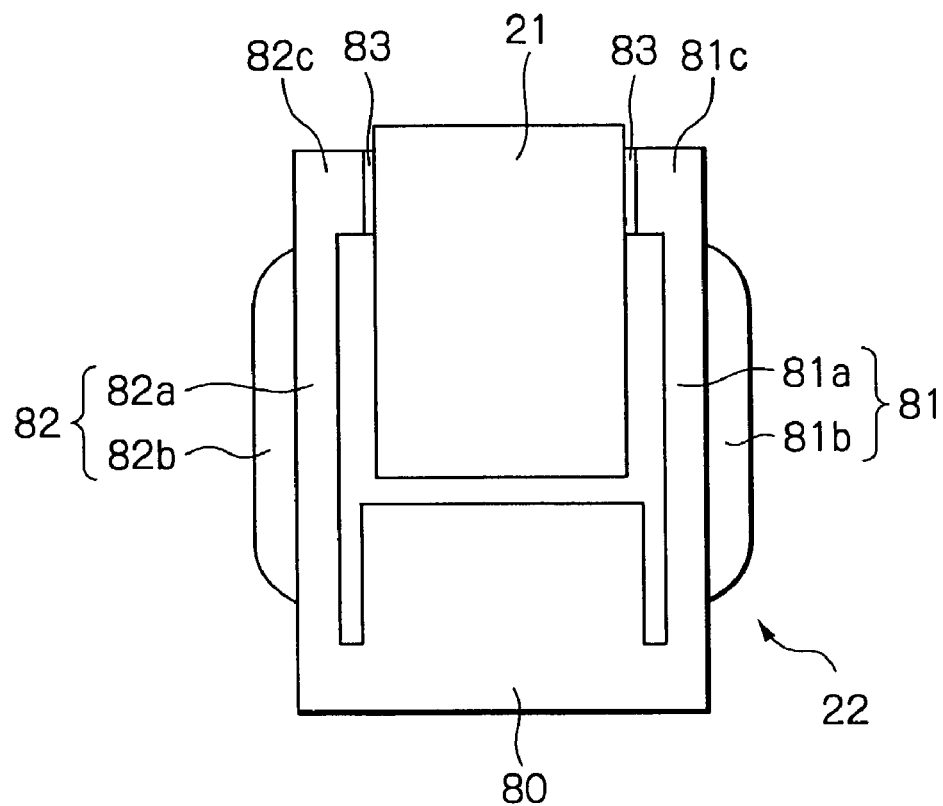
FIG. 8 is a plane view illustrating a structure of an actuator and an adhering structure of this actuator to a magnetic head slider in another embodiment according to the present invention.
Figure 9:
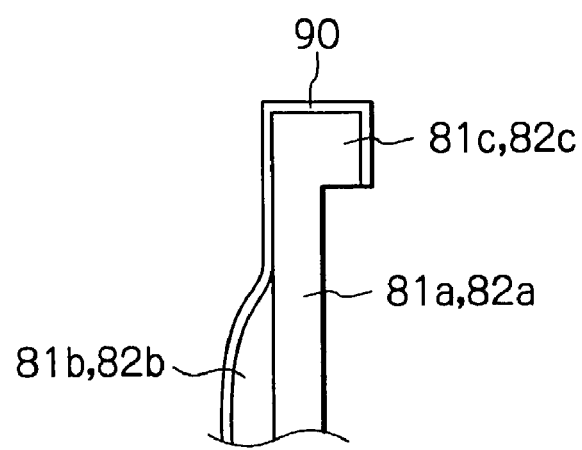
FIG. 9 is a plane view illustrating a top end section of the actuator in the embodiment of FIG. 8.

FIG. 8 illustrates a structure of an actuator and an adhering structure of this actuator to a magnetic head slider in another embodiment according to the present invention, and FIG. 9 illustrates a top end section of the actuator in the embodiment of FIG. 8.

Configurations, operations and advantages of a magnetic disk apparatus and an HGA in this embodiment are the same as those of the embodiment of FIG. 1 except for the structure of the actuator.

As will be noted from FIG. 8, the actuator has a rough U-plane shape and consists of a base 80 to be fixed to a suspension and a pair of movable arms 81 and 82 substantially perpendicularly extending from both side ends of the base 80. The movable arms 81 and 82 consist of arm members 81a and 82a and piezoelectric elements 81b and 82b formed on side surfaces of the arm members 81a and 82a, respectively.

The base 80 and the arm members 81a and 82a of the actuator 82 are united by an elastic sintered ceramic. Since the main sections of the actuator are made of the elastic sintered ceramic that is strong for bending, a shock resistance of the actuator itself increases.

The actuator in this embodiment has slider fixing sections 81c and 82c fixed to side surfaces of the magnetic head slider 21 at top end sections of the arm members 81a and 82a of the movable arms 81 and 82, respectively. These slider fixing sections 81c and 82c are projected inwardly, namely toward the magnetic head slider 21, so that only these sections 81c and 82c are attached to the side surfaces of the magnetic head slider 21 and that there exists air gaps between the remaining sections of the movable arms 81 and 82 and the side surfaces of the magnetic head slider 21.

The magnetic head slider 21 is caught between these slider fixing sections 81c and 82c and adhered to the arm members 81a and 82a. This adhesion is performed by inserting an ACF 83 between each arm member and the slider 21, and by pressing them with heating. Usage of the ACF 83 for the adhesion presents very easy adhesion process and shortage of a required time for the adhesion process. Also, by using the ACF 83, it is possible to precisely control an adhering region and to uniformly control a thickness of the adhering region. As a result, a quite stable stroke and an extremely stable resonance characteristics of the actuator can be expected.

In this embodiment, also as shown in FIG. 9, the ground connection conductors 90 patterned to cover the adhering regions of the fixing sections 81c and 82c and electrically connected to the ground connection terminals 32 (FIG. 3) are formed on the surfaces of the arm members 81a and 82a. Therefore, if the ACF 83 is used for the adhesion between the slider 21 and the actuator, the slider 21 is grounded resulting the countermeasure against ESD destruction of the magnetic head element 21a to achieve very easily.

The ground connection conductors 90 may be fabricated by printing a thick-film pattern made of Pt, Au or Pt+Au and then sintering it.

Other structure, operations and advantages of this embodiment are the same as those of the embodiment shown in FIG. 1.

Figure 10:
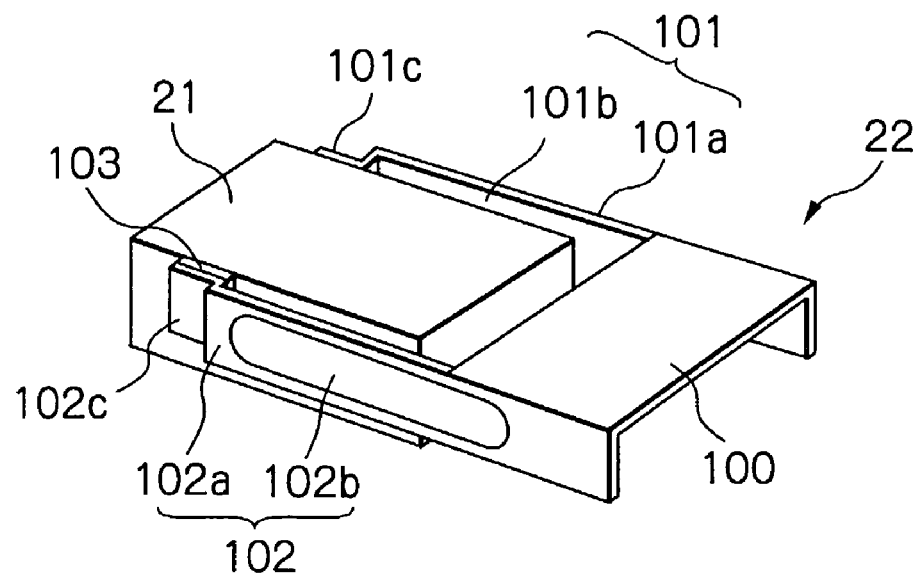
FIG. 10 is an oblique view illustrating a structure of an actuator and an adhering structure of this actuator to a magnetic head slider in a further embodiment according to the present invention.

FIG. 10 illustrates a structure of an actuator and an adhering structure of this actuator to a magnetic head slider in a further embodiment according to the present invention.

Configurations, operations and advantages of a magnetic disk apparatus and an HGA in this embodiment are the same as those of the embodiment of FIG. 1 except for the structure of the actuator.

As will be noted from the figure, the main portion of the actuator 22 in this embodiment is formed by cutting a metal plate into individual actuator members each having a rough U-plane shape and by bending each of them in a three-dimensional shape. Namely, the actuator member is bent at both side ends of its plane base 100 toward almost perpendicular direction. A pair of movable arms 101 and 102 that are kept in almost perpendicular to the base 100 extend frontward from these bent areas. The upper surface, in the figure, of the base 100 is fixed to the suspension. The movable arms 101 and 102 are formed in a plane shape parallel to the side surfaces of the magnetic head slider 21.

At top end sections of the movable arms 101 and 102, formed respectively are slider fixing sections 101c and 102c to be fixed to the side surfaces of the magnetic head slider 21 by bending the arms inwardly in a crank arm shape. The spacing between the slider fixing sections 101c and 102c is determined to a value slightly shorter than the width of the magnetic head slider to be caught therein. A height of the actuator 22 is determined to a value equal to or smaller than that of the magnetic head slider to be held so that the total height or thickness of the HGA will not increase due to the mounting of the actuator. Conversely, by increasing the height of the actuator 22 up to the thickness of the magnetic head slider to be held, strength of the actuator itself can be increased without increasing the total thickness of the HGA.

The slider fixing sections 101c and 102c are bent inwardly to project toward the side surfaces of the magnetic head slider 21, so that only these sections 101c and 102c are attached to the side surfaces of the magnetic head slider 21 and that there exists air gaps between the remaining sections of the movable arms 101 and 102 and the side surfaces of the magnetic head slider 21.

The magnetic head slider 21 is caught between these slider fixing sections 101c and 102c and adhered to the arm members 101a and 102a. This adhesion is performed by inserting an ACF 103 between each arm member and the slider 21, and by pressing them with heating. Usage of the ACF 103 for the adhesion presents very easy adhesion process and shortage of a required time for the adhesion process. Also, by using the ACF 103, it is possible to precisely control an adhering region and to uniformly control a thickness of the adhering region. As a result, a quite stable stroke and an extremely stable resonance characteristics of the actuator can be expected. Furthermore, since the slider 21 is grounded only by using the ACF 103 for the adhesion between the slider 21 and the actuator, the countermeasure against ESD destruction of the magnetic head element 21a can be achieved very easily.

The movable arms 101 and 102 consist of arm members 101a and 102a and piezoelectric elements 101b and 102b formed on side surfaces of the arm members 101a and 102a, respectively.

The base 100 and the arm members 101a and 102a of the actuator 22 are united and formed by bending an elastic single metal plate such as a stainless steel plate for example. Since the main sections of the actuator are made of the metal plate, a weight of the actuator decreases and also a shock resistance of the actuator itself increases. Instead of a steel alloy spring plate such as the stainless steel plate, a resilient plate spring member for example a carbon steel spring plate, a copper alloy spring plate such as copper titanium plate, a phosphor bronze plate or a beryllium copper plate, or a titanium plate may be used. In case that the piezoelectric elements 101b and 102b are formed by printing and sintering, it is necessary to use a high heat resistance metal plate.

Other structure, operations and advantages of this embodiment are the same as those of the embodiment shown in FIG. 1.

Figure 11:
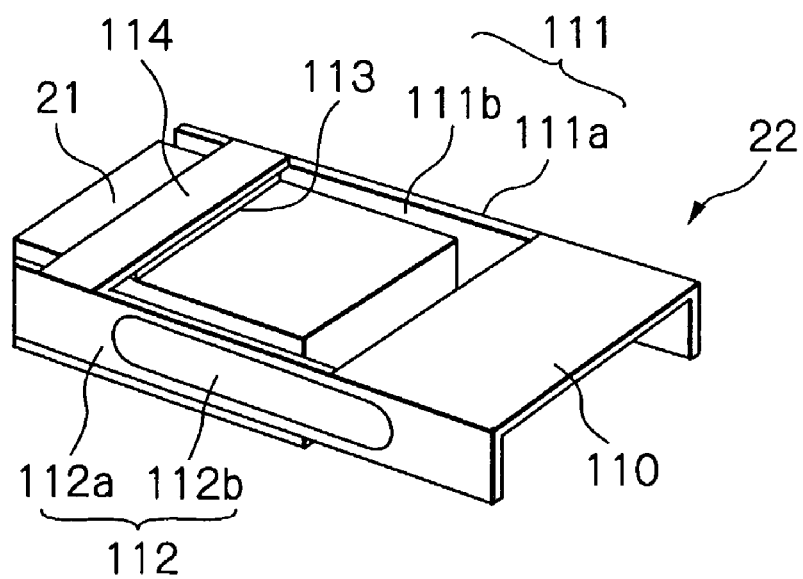
FIG. 11 is an oblique view illustrating a structure of an actuator and an adhering structure of this actuator to a magnetic head slider in a still further embodiment according to the present invention.

FIG. 11 illustrates a structure of an actuator and an adhering structure of this actuator to a magnetic head slider in a still further embodiment according to the present invention.

Configurations, operations and advantages of a magnetic disk apparatus and an HGA in this embodiment are the same as those of the embodiment of FIG. 1 except for the structure of the actuator.

As will be noted from the figure, the main portion of the actuator 22 in this embodiment is formed by cutting a metal plate into individual actuator members each having a ladder plane shape and by bending each of them in a three-dimensional shape. Namely, the actuator member with the ladder plane shape is bent at somewhat inward positions from both side ends of its strip shape base 110 and its strip shape coupling member 114 toward almost perpendicular direction. A pair of movable arms 111 and 112 that are kept in almost perpendicular to the base 110 extend in parallel with each other frontward and backward from these bent areas. The upper surface, in the figure, of the base 110 is fixed to the suspension and the lower surface, in the figure, of the coupling member 114 is fixed to the magnetic head slider 21. Since it is bent at the inward positions of the both side ends of the coupling member 114, the movable arms 111 and 112 are formed in a strip plane shape that is in parallel with the side faces of the magnetic head slider 21. In order to deform the movable arms with a low driving force, it is very important to form the whole of the movable arms in such plane shape.

The coupling member 114 couples the movable arms 111 and 112 with each other at positions near the top ends of these movable arms. The base 110 and the coupling member 114 are formed in parallel with the opposite face of the ABS of the magnetic head slider 21. A height of the actuator 22 is determined to a value equal to or smaller than that of the magnetic head slider to be mounted so that the total height or thickness of the HGA will not increase due to the mounting of the actuator. Conversely, by increasing the height of the actuator 22 up to the thickness of the magnetic head slider to be held, strength of the actuator itself can be increased without increasing the total thickness of the HGA.

The magnetic head slider 21 is adhered to the coupling member 114 located between the top end sections of the movable arms 111 and 112. This adhesion is performed by inserting an ACF 113 between the coupling member 114 and the opposite face of the ABS of the slider 21, and by pressing them with heating. Usage of the ACF 113 for the adhesion presents very easy adhesion process and shortage of a required time for the adhesion process. Also, by using the ACF 113, it is possible to precisely control an adhering region and to uniformly control a thickness of the adhering region. Furthermore, since the slider 21 is grounded only by using the ACF 113 for the adhesion between the slider 21 and the actuator, the countermeasure against ESD destruction of the magnetic head element 21a can be achieved very easily.

The movable arms 111 and 112 consist of arm members 111a and 112a and piezoelectric elements 111b and 112b formed on side surfaces of the arm members 111a and 112a, respectively.

The base 110, the coupling member 114 and the arm members 111a and 112a of the actuator 22 are united and formed by bending an elastic single metal plate such as a stainless steel plate for example. Since the main sections of the actuator are made of the metal plate, a weight of the actuator decreases and also a shock resistance of the actuator itself increases. Instead of a steel alloy spring plate such as the stainless steel plate, a resilient plate spring member for example a carbon steel spring plate, a copper alloy spring plate such as copper titanium plate, a phosphor bronze plate or a beryllium copper plate, or a titanium plate may be used. In case that the piezoelectric elements 111b and 112b are formed by printing and sintering, it is necessary to use a high heat resistance metal plate.

In this embodiment, since the magnetic head slider 21 is fixed to the coupling member 114, enough fixing strength of the magnetic head slider 21 with the actuator 22 can be expected and it is possible to greatly improve vertical impact resistance of the HGA. Also, easy mounting of the magnetic head slider 21 can expected even if the size of the slider 21 changes.

Other structure, operations and advantages of this embodiment are the same as those of the embodiment shown in FIG. 1.

In the aforementioned embodiments, the precise positioning actuators for the thin-film magnetic head element and the HGA with the actuator is described. However, it is apparent that the present invention can be applied to a precise positioning actuator for a head element such as an optical head element other than the thin-film magnetic head element and an HGA with the actuator.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly including a head slider with at least one head element,
   a precise positioning actuator fixed to said head slider for precisely positioning said at least one head element, and
   a support for supporting said actuator,
   said actuator comprising a pair of movable arms capable of displacing in response to a drive signal applied to said actuator,
   said head slider being mounted between said pair of movable arms,
   said head slider and said actuator being adhered by at least one adhesive films
   wherein a spacing between said moveable arms at a base of said actuator is larger than the width of the head slider so that an air gap exists between said movable arms and said head slider with said movable arms deformed such that a space between them will gradually narrow toward a top end sections of the movable arms such that only the top end sections of said movable arm members are adhered to side surfaces of said head slider using said at least one adhesive film so that said movable arms will not come in contact with said head slider so as to limit the movement of the actuator in operation.

2. The head gimbal assembly as claimed in claim 1, wherein top end sections of said pair of movable arms and side surfaces of said head slider are adhered by adhesive films, respectively.

3. The head gimbal assembly as claimed in claim 1, wherein each of said pair of movable arms comprises an elastic arm member and a piezoelectric element formed on a side surface of said elastic arm member.

4. The head gimbal assembly as claimed in claim 3, wherein said actuator further comprises a base fixed to said support, said elastic arm member extending from said base.

5. The head gimbal assembly as claimed in claim 4, wherein said elastic arm member and said base are made of an elastic sintered ceramic.

6. The head gimbal assembly as claimed in claim 3, wherein said elastic arm member has substantially the same cross sectional shape from a root thereof to a top end thereof.

7. The head gimbal assembly as claimed in claim 3, wherein said elastic arm member has at a top end section thereof a slider fixing section projected toward said head slider.

8. The head gimbal assembly as claimed in claim 1, wherein said actuator has a rough U-plane shape.

9. The head gimbal assembly as claimed in claim 1, wherein said at least one adhesive film is an anisotropic conductive film.

10. The head gimbal assembly as claimed in claim 9, wherein said actuator further comprises connection conductors formed on surfaces of said pair of movable arms, for grounding said anisotropic conductive film.

11. The head gimbal assembly as claimed in claim 4, wherein said elastic arm member and said base are made of an elastic metal plate member.

12. The head gimbal assembly as claimed in claim 11, wherein said metal plate member is made of a stainless steel plate.

13. The head gimbal assembly as claimed in claim 11, wherein said elastic arm member has at a top end section thereof a slider fixing section projected toward said head slider.

14. The head gimbal assembly as claimed in claim 1, wherein said actuator further comprises a coupling member made of a metal plate member for coupling said pair of movable arms with each other at top end sections of said pair of movable arms, an opposite surface of an air bearing surface of said head slider and said coupling member being adhered by said at least one adhesive film.

15. The head gimbal assembly as claimed in claim 14, wherein each of said pair of movable arms comprises an arm member made of an elastic metal plate member, and a piezoelectric element formed on a side surface of said arm member.

16. The head gimbal assembly as claimed in claim 14, wherein said actuator further comprises a base made of a metal plate member parallel to said coupling member and fixed to said support, said pair of movable arms extending from said base.

17. The head gimbal assembly as claimed in claim 16, wherein said metal plate member is made of a stainless steel plate.

18. The head gimbal assembly as claimed in claim 1, wherein said at least one adhesive film is an anisotropic conductive film.

19. The head gimbal assembly as claimed in claim 1, wherein said at least one head element is at least one thin-film magnetic head element.

20. A disk drive apparatus having at least one head gimbal assembly that includes a head slider with at least one head element,
   a precise positioning actuator fixed to said head slider for precisely positioning said at least one head element, and
   a support for supporting said actuator,
   said actuator comprising a pair of movable arms capable of displacing in response to a drive signal applied to said actuator,
   said head slider being mounted between said pair of movable arms,
   said head slider and said actuator being adhered by at least one adhesive film
   wherein a spacing between said moveable arms at a base of said actuator is larger than the width of the head slider so that an air gap exists between said movable arms and said head slider with said movable arms deformed such that a space between them will gradually narrow toward a top end sections of the movable arms such that only the top end sections of said movable arm members are adhered to side surfaces of said head slider using said at least one adhesive film so that said movable arms will not come in contact with said head slider so as to limit the movement of the actuator in operation.

21. The disk drive apparatus as claimed in claim 20, wherein top end sections of said pair of movable arms and side surfaces of said head slider are adhered by adhesive films, respectively.

22. The disk drive apparatus as claimed in claim 20, wherein each of said pair of movable arms comprises an elastic arm member and a piezoelectric element formed on a side surface of said arm member.

23. The disk drive apparatus as claimed in claim 22, wherein said actuator further comprises a base fixed to said support, said arm members extending from said base.

24. The disk drive apparatus as claimed in claim 23, wherein said arm members and said base are made of an elastic sintered ceramic.

25. The disk drive apparatus as claimed in claim 22, wherein said arm member has substantially the same cross sectional shape from a root thereof to a top end thereof.

26. The disk drive apparatus as claimed in claim 22, wherein said arm member has at a top end section thereof a slider fixing section projected toward said head slider.

27. The disk drive apparatus as claimed in claim 20, wherein said actuator has a rough U-plane shape.

28. The disk drive apparatus as claimed in claim 20, wherein said at least one adhesive film is an anisotropic conductive film.

29. The disk drive apparatus as claimed in claim 28, wherein said actuator further comprises connection conductors formed on surfaces of said pair of movable arms, for grounding said anisotropic conductive film.

30. The disk drive apparatus as claimed in claim 23, wherein said arm members and said base are made of an elastic metal plate member.

31. The disk drive apparatus as claimed in claim 30, wherein said metal plate member is made of a stainless steel plate.

32. The disk drive apparatus as claimed in claim 30, wherein said arm member has at a top end section thereof a slider fixing section projected toward said head slider.

33. The disk drive apparatus as claimed in claim 20, wherein said actuator further comprises a coupling member made of a metal plate member for coupling said pair of movable arms with each other at top end sections of said pair of movable arms, an opposite surface of an air bearing surface of said head slider and said coupling member being adhered by said at least one adhesive film.

34. The disk drive apparatus as claimed in claim 33, wherein each of said pair of movable arms comprises an arm member made of an elastic metal plate member, and a piezoelectric element formed on a side surface of said arm member.

35. The disk drive apparatus as claimed in claim 33, wherein said actuator further comprises a base made of a metal plate member parallel to said coupling member and fixed to said support, said pair of movable arms extending from said base.

36. The disk drive apparatus as claimed in claim 35, wherein said metal plate member is made of a stainless steel plate.

37. The disk drive apparatus as claimed in claim 20, wherein said at least one adhesive film is an anisotropic conductive film.

38. The disk drive apparatus as claimed in claim 20, wherein said at least one head element is at least one thin-film magnetic head element.

39. A method of manufacturing a head gimbal assembly with a precise positioning actuator, said method comprising the steps of:
preparing a head slider with at least one head element, the actuator with a pair of movable arms capable of displacing in response to a drive signal applied to said actuator, for catching said head slider in a space between said pair of movable arms and a support for supporting said actuator;
adhering top end sections of said pair of movable arms and side surfaces of said head slider by adhesive films, respectively; and
fixing said actuator to said support,
wherein a spacing between said moveable arms at a base of said actuator is larger than the width of the head slider so that an air gap exists between said movable arms and said head slider with said movable arms deformed such that a space between them will gradually narrow toward a top end sections of the movable arms such that only the top end sections of said movable arm members are adhered to side surfaces of said head slider using said adhesive films so that said movable arms will not come in contact with said head slider so as to limit the movement of the actuator in operation.

40. The method as claimed in claim 39, wherein said preparing step comprises preparing, as said actuator, an actuator with the pair of movable arms, each having an elastic arm member and a piezoelectric element formed on a side surface of said arm member.

41. The method as claimed in claim 40, wherein said preparing step comprises preparing, as said actuator, an actuator with a base fixed to said support, said arm members extending from said base.

42. The method as claimed in claim 41, wherein said preparing step comprises preparing, as said actuator, an actuator with said arm members and said base made of an elastic sintered ceramic.

43. The method as claimed in claim 40, wherein said preparing step comprises preparing, as said actuator, an actuator with a pair of arm members each having substantially the same cross sectional shape from a root thereof to a top end thereof.

44. The method as claimed in claim 40, wherein said preparing step comprises preparing, as said actuator, an actuator with a arm member having at a top end section thereof a slider fixing section projected toward said head slider.

45. The method as claimed in claim 39, wherein said preparing step comprises preparing, as said actuator, an actuator with a rough U-plane shape.

46. The method as claimed in claim 39, wherein said adhering step comprises adhering the top end sections of said pair of movable arms and the side surfaces of said head slider by anisotropic conductive films, respectively.

47. The method as claimed in claim 46, wherein said preparing step comprises preparing, as said actuator, an actuator with connection conductors formed on surfaces of the pair of movable arms thereof, for grounding said anisotropic conductive films, respectively.

48. The method as claimed in claim 41, wherein said preparing step comprises preparing, as said actuator, an actuator with said arm members and said base made of an elastic metal plate members.

49. The method as claimed in claim 48, wherein said metal plate member is made of a stainless steel plate.

50. The method as claimed in claim 48, wherein said preparing step comprises preparing, as said actuator, an actuator with a arm member having at a top end section thereof a slider fixing section projected toward said head slider.

51. The method as claimed in claim 39, wherein said preparing step comprises preparing, as said at least one head element, at least one thin-film magnetic head element.

52. A method of manufacturing a head gimbal assembly with a precise positioning actuator, said method comprising the steps of:
preparing a head slider with at least one head element, the actuator with a pair of movable arms capable of displacing in response to a drive signal applied to said actuator and a coupling member made of a metal plate member for coupling said pair of movable arms with each other at top end sections of said pair of movable arms, and a support for supporting said actuator;

adhering an opposite surface of an air bearing surface of said head slider and said coupling member by an adhesive film; and fixing said actuator to said support, wherein a spacing between said moveable arms at a base of said actuator is larger than the width of the head slider so that an air gap exists between said movable arms and said head slider with said movable arms deformed such that a space between them will gradually narrow toward a top end sections of the movable arms such that only the top end sections of said movable arm members are adhered to side surfaces of said head slider using said adhesive films so that said movable arms will not come in contact with said head slider so as to limit the movement of the actuator in operation.

53. The method as claimed in claim 52, wherein said preparing step comprises preparing, as said actuator, an actuator with the pair of movable arms, each having an arm member made of an elastic metal plate member, and a piezoelectric element formed on a side surface of said arm member.

54. The method as claimed in claim 52, wherein said preparing step comprises preparing, as said actuator, an actuator with a base made of a metal plate member parallel to said coupling member and fixed to said support, said pair of movable arms extending from said base.

55. The method as claimed in claim 54, wherein said metal plate member is made of a stainless steel plate.

56. The method as claimed in claim 52, wherein said adhering step comprises adhering the opposite surface of the air bearing surface of said head slider and said coupling member by an anisotropic conductive film.

57. The method as claimed in claim 52, wherein said preparing step comprises preparing, as said at least one head element, at least one thin-film magnetic head element.

* * * * *